United States Patent
Yi et al.

(10) Patent No.: US 10,852,928 B2
(45) Date of Patent: Dec. 1, 2020

(54) SURFACE CURVATURE CONTROL OF DISPLAY SCREEN BASED ON MOTION OF SUPPORT PORTIONS

(71) Applicant: SONY CORPORATION, Tokyo (JP)

(72) Inventors: Hyehoon Yi, San Diego, CA (US); Toshihiko Fushimi, San Diego, CA (US); Lindsay Miller, San Diego, CA (US); David Young, San Diego, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/220,932

(22) Filed: Dec. 14, 2018

(65) Prior Publication Data

US 2020/0192557 A1    Jun. 18, 2020

(51) Int. Cl.
| G06F 3/0484 | (2013.01) |
| G06F 3/0481 | (2013.01) |
| G06F 1/16 | (2006.01) |
| H04N 5/64 | (2006.01) |
| G06F 3/01 | (2006.01) |
| G02F 1/1333 | (2006.01) |

(52) U.S. Cl.
CPC .... G06F 3/04847 (2013.01); G02F 1/133305 (2013.01); G06F 1/1652 (2013.01); G06F 3/017 (2013.01); G06F 3/04815 (2013.01); H04N 5/64 (2013.01)

(58) Field of Classification Search
CPC .............................. H04N 19/119; H04N 19/11
See application file for complete search history.

(56) References Cited

U.S. PATENT DOCUMENTS

| 9,645,605 | B2 | 5/2017 | Park et al. |
| 2014/0054438 | A1 | 2/2014 | Yun et al. |
| 2016/0191837 | A1* | 6/2016 | Huh ................... H04N 5/44591 348/564 |
| 2017/0010689 | A1* | 1/2017 | Bostick .................... G06T 3/40 |
| 2017/0041568 | A1* | 2/2017 | Rakshit ................ G06F 3/0346 |
| 2017/0289491 | A1* | 10/2017 | Park ........................ H04N 5/64 |
| 2019/0049759 | A1* | 2/2019 | Wang ................... H05K 5/0217 |
| 2020/0012651 | A1* | 1/2020 | Matsuda .............. G06F 16/435 |

* cited by examiner

*Primary Examiner* — William C Vaughn, Jr.
*Assistant Examiner* — Jerry T Jean Baptiste
(74) *Attorney, Agent, or Firm* — Chip Law Group

(57) ABSTRACT

A display apparatus that comprises a display screen and a set of support portions, is provided. The display apparatus receives a user input that corresponds to a configuration of the display screen and controls motion of the set of support portions based on the received user input. A change in a surface curvature of the display screen is based on the motion of the set of support portions.

22 Claims, 10 Drawing Sheets

SURFACE CURVATURE CONTROL OF DISPLAY SCREEN BASED ON MOTION OF SUPPORT PORTIONS

CROSS-REFERENCE TO RELATED APPLICATIONS/INCORPORATION BY REFERENCE

None.

FIELD

Various embodiments of the disclosure relate to display technologies. More specifically, various embodiments of the disclosure relate to a display apparatus for surface curvature control of a display screen based on motion of support portions.

BACKGROUND

Advancements in the field of display devices have led to the development of various techniques to provide a viewing experience to a viewer. In certain scenarios, a display screen of a conventional display device may have a fixed surface curvature. The surface curvature may be fixed at the time of manufacturing of the display device. In such cases, the viewer may have to be present at a specific distance to get a desired viewing experience. Other viewers at different viewing positions may not get the same viewing experience due to the fixed surface curvature of the display screen.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A display apparatus and a method for surface curvature control of a display screen based on motion of support portions, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in a disclosed display apparatus for surface curvature control of a display screen based on motion of support portions. Exemplary aspects of the disclosure provide a solution to enhance a viewing experience for viewers associated with the display apparatus. The disclosure provides a solution to dynamically control a motion of a set of support portions coupled to the display screen, based on a user input. The motion of the set of support portions may be controlled to change a surface curvature of the display screen. With the control over the motion of the set of support portions, the surface curvature of the display screen may be adapted to a field of view of a viewer who may watch media on the display screen from a specific viewing distance. This may also provide a level of comfort and flexibility to the viewer to switch a viewing position, a viewing posture, a viewing angle, and the like. The disclosed display apparatus may provide an on-demand surface curvature control and an immersive viewing experience to the viewer. The on-demand surface curvature control may provide a smooth viewing experience to the viewer for different applications, such as a gaming events, a sports or casual entertainment, a media playback for a wide audience, or a wallpaper display as a home décor. Also, a control over a change in the surface curvature based on the user input may provide a control over a level of immersive 3D viewing experience for a viewer. The disclosure further provides a solution to adapt the surface curvature for a seamless viewing experience for multi-user audience in different types of installation environments, such as parties, concerts, and stadium matches. The disclosure further provides a solution for viewers to select different configuration settings, for example, a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, and a default mode. Each mode may correspond to a different surface curvature of the display screen.

Figure 1:
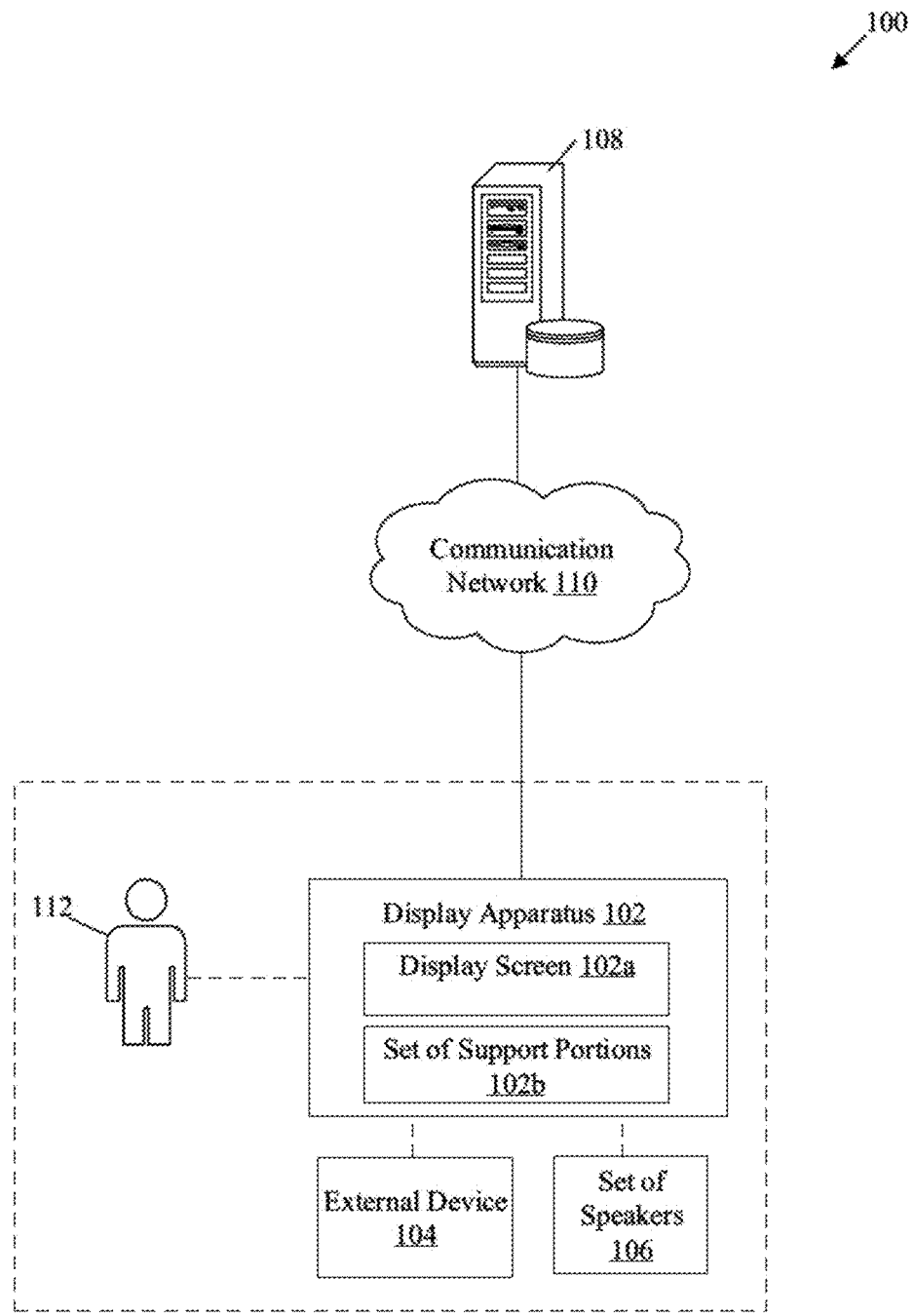
FIG. 1 is a block diagram that illustrates an exemplary network environment for surface curvature control of a display screen based on motion of support portions, in accordance with an embodiment of the disclosure.

FIG. 1 is a block diagram that illustrates an exemplary network environment for surface curvature control of a display screen based on motion of support portions, in accordance with an embodiment of the disclosure. With reference to FIG. 1, there is shown an exemplary network environment 100 that includes a display apparatus 102, an external device 104, and a set of speakers 106 that may be communicatively coupled to the display apparatus 102. The display apparatus 102 may include a display screen 102a and a set of support portions 102b. There is further shown a data store 108 that may be communicatively coupled to the display apparatus 102, via a communication network 110. There is further shown a user 112 who is associated with the display apparatus 102.

The display apparatus 102 may comprise suitable logic, circuitry and interfaces that may be configured to control a motion of the set of support portions 102b to cause a change in a surface curvature of the display screen 102a. The change in the surface curvature of the display screen 102a may correspond to a change in an angle of curvature and a radius of curvature of the display screen 102a. The motion of the set of support portions 102b may be controlled based on a user input that may correspond to a configuration of the display screen 102a of the display apparatus 102. Examples of the display apparatus 102 may include, but are not limited to, a television (TV), such as a smart TV, a three-dimensional (3D) display device, and a Free Viewpoint TV (FTV), a New Form Factor (NFF) TV, a computing device, an e-paper, a laptop computer, a home theatre system, a wearable device, a video conferencing device, a digital media player, a micro-console, a gaming console, a High Definition Multi-media Interface (HDMI) compliant source device, a smartphone, a tablet computer, a video-conferencing system, a mainframe machine, a computer work-station, a consumer electronic (CE) device, and a media processing system.

The display screen 102a may be a flexible, a bendable, a rollable, and/or a curved display screen. The curvature of the display screen 102a may change based on a control of the motion of the set of support portions 102b. The control of the motion of the set of support portions 102b may cause a change in the surface curvature of the display screen 102a. The display screen 102a may be made up of a flexible material (such as a flexible substrate) that may bend based on application of forces on one or more of the set of support portions 102b of the display screen 102a to support the change in the surface curvature of the display screen 102a. The display screen 102a may be realized through several display technologies, such as a Liquid Crystal Display (LCD) display, a Light Emitting Diode (LED) display, a plasma display, and an Organic LED (OLED) display technology, and other display technologies. In accordance with an embodiment, the display screen 102a may refer to a display of a smart-glass device, a see-through display, a projection-based display, an electro-chromic display, and a transparent display.

It may be noted that the display screen 102a is a flexible display screen when the surface curvature of the display screen 102a changes based on application of stress on one or more regions of the display screen 102a. It may be further noted that the display screen 102a is a rollable display screen when the display screen 102a rolls up into a cylindrical roll (e.g., a scroll) or unrolls from the cylindrical roll. It may be further noted that the display screen 102a is a bendable display screen when two distal ends to the display screen 102a bend at one or more bending planes.

The set of support portions 102b may be a support member or an assembly of support members that may be coupled to one or more components, such as the display screen 102a and the set of speakers 106, of the display apparatus 102. The set of support portions 102b may provide a physical support to the one or more components. The physical support may be related to a support of the weight of the one or more components against one or more structural members, such as a wall, a floor, a ceiling, a table, a rod, a wire, and a stand, of an installation environment. The installation environment may be a room, a hall, an open-stage, an open environment (such as a stadium, a park, a street, or a road), or a closed environment (such as a room or a concert stage of a closed auditorium). The display apparatus 102 may be configured to control the motion of the set of support portions 102b based on control signals that drive actuators coupled to the set of support portions 102b. The actuators may drive the set of support portions 102b, which may cause the change in the surface curvature of the display screen 102a. Examples of the set of support portions 102b may include, but are not limited to, a bracket (such as a mountable bracket), a holder, a side stand, an attachment panel, a support stand, a speaker stand, a hook, a frame, a cord or wire, and a cable connection panel.

The external device 104 may comprise suitable logic, circuitry and interfaces that may be configured to receive a user input from the user 112. The user input may include a selection of a configuration of the display screen 102a. Example of external device 104 may include, but are not limited to, a TV remote, a smart TV remote, a smartphone, a haptic switch, a gesture sensor, a motion sensor, a smart speaker, a smart voice assistant, a paired (or connectable) microphone, a set top box, a smartphone, a tablet computer, a special-purpose device, a video-conferencing system, a mainframe machine, a computer work-station, a consumer electronic (CE) device, or a specialized physical input device (e.g., a button that is common for every product, or a product-specific button).

The set of speakers 106 may be part of a sound system of the display apparatus 102. In accordance with an embodiment, the set of speakers 106 may be one of wireless speakers or wired speakers that may be coupled to the set of support portions 102b. In accordance with another embodiment, each support portion of the set of support portions 102b may include a speaker holder to hold a corresponding speaker of the set of speakers 106. In accordance with yet another embodiment, the set of speakers 106 may be present within a housing of the display screen 102a.

The data store 108 may comprise suitable logic, circuitry and interfaces that may be configured to store and communicate media content to the display apparatus 102, based on requests received from the display apparatus 102, via the communication network 110. Examples of the media content may include, but are not limited to, audio-video (AV) content, textual content, images, video content, animation content, gaming content, and/or interactive content. Also, the data store 108 may be configured to store a database of different configuration settings for the display apparatus 102. The data store 108 may be configured to transmit the media content and/or the configuration settings to the display apparatus 102, via the communication network 110. In some embodiments, the data store 108 may be implemented as a cloud server, which may be utilized to execute aforementioned operations through web applications, cloud applications, HTTP requests, repository operations, file transfer, gaming operations, and the like. In such cases, the data store 108 may be a part of a content delivery network (CDN) and/or or a distributed network of media servers that may deliver on-demand, live, or linear media content to the display apparatus 102. Other examples of the data store 108 include, but are not limited to, a database server, a file server, a web server, an application server, a mainframe server, a cloud server, or other types of server.

In accordance with an embodiment, the data store 108 may be a personal media device that may deliver the media content to the display apparatus 102, via the communication network 110. Examples of the personal media device may include, but are not limited to, a smartphone, a music player, a video player, a laptop, a personal computer, a personal external storage, and a flash drive.

The communication network 110 may include one or more mediums through which the display apparatus 102 may communicate with the data store 108. Examples of the communication network 110 may include, but are not limited to, a Wireless Fidelity (Wi-Fi) network, a Local Area Network (LAN), a Personal Area Network (PAN), a Wireless Personal Area Network (WPAN), a Wireless Local Area Network (WLAN), a Wireless Wide Area Network (WWAN), a cloud network, a Long Term Evolution (LTE) network, a Metropolitan Area Network (MAN), and/or the Internet. Various devices in the exemplary network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the display apparatus 102 may receive a user input from one or more users, such as the user 112. The user input may include at least one of a voice input, a gesture input, a touch input, or an input via the external device 104. The user input may correspond to a configuration of the display screen 102a. More specifically, the user input may be indicative of a user preference for one or more functions associated with the display screen 102a. Examples of the one or more functions may include, but are not limited to, playback controls, On/Off display state controls, or other functions associated with voice commands, gesture commands, touch commands, user activities, and/or a combination thereof.

The display apparatus 102 may be configured to determine the configuration that is indicated in the user input from the user 112. The configuration may be a display screen configuration, such as a level of a surface curvature of the display screen 102a. The level of surface curvature may be indicated by a Gaussian curvature value, which may be zero (0) for a flat screen configuration of the display screen 102a, or a positive or negative value for different curved screen configurations. Alternatively, the level of surface curvature may be indicated by an angle of curvature or a radius of curvature, for example, "3000 mm", "4000 mm", and "1600 mm".

As an example, the user input may correspond to a change of a current flat screen configuration to a curved screen configuration of the display screen 102a, or vice versa. As another example, the user input may be an instruction to switch on the display screen 102a for display of the media content. Such user input may correspond to a change in a current display screen configuration to a default curved display screen configuration or a past display screen configuration of the display screen 102a. As yet another example, the user input may be indicative of the level of surface curvature of the display screen 102a, in terms of parameters, such as the radius of curvature or the angle of curvature.

In accordance with an embodiment, the display apparatus 102 may be configured to select a configuration setting of the set of configuration settings of the display apparatus 102. In such cases, the user input may correspond to a selection of the configuration setting (such as a desired entertainment) of the display apparatus 102. The set of configuration settings may be pre-stored in the display apparatus 102 or may be retrieved from the data store 108, via the communication network 110. The set of configuration settings may include, but are not limited to, a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, or a default mode. Each configuration setting may be associated with a same or a different playback specification, such as sound effects and display attributes (e.g., aspect ratio, contrast, brightness, hue, saturation, or gamma) and screen configurations, such as a surface curvature of the display screen 102a, a screen orientation angle, and viewing angles. Also, the amount of the change in the surface curvature may be different for each configuration setting of the set of configuration settings corresponding to the received user input. For example, the user input may be a voice input, such as "Play a movie "ABC" in Hall". In such cases, the voice input may correspond to a configuration setting, such as the cinema mode. The display apparatus 102 may be configured to determine a new level of the surface curvature of the display screen 102a, in accordance with the selected configuration setting. In some cases, the new level of the surface curvature may be pre-specified in the selected configuration setting on the display apparatus 102.

The display apparatus 102 may be further configured to control the motion of the set of support portions 102b based on the received user input. The motion of the set of support portions 102b may correspond to at least a linear motion, a non-linear motion, or a combination of the linear motion and the non-linear motion of the set of support portions 102b along a defined path. The change in the surface curvature (i.e. from a current surface curvature value to a new surface curvature value) of the display screen 102a may be based on the motion of the set of support portions 102b. The change in the surface curvature may correspond to a change in the angle of curvature and the radius of curvature of the display screen 102a. For example, the set of support portions 102b may be support stands coupled to side portions of the display screen 102a. The support stands may rotate in opposite directions (inward) to cause a change in the surface curvature of the display screen 102a. In such cases, the display apparatus 102 may be configured to control the motion of actuators coupled to the set of support portions 102b to cause a change in the surface curvature of the display screen 102a. The operation of the display apparatus 102 is described in detail, for example, in FIGS. 2, 3, 4A, 4B, 5A, 5B, 6A, 6B, and 7A, 7B, 8, 9A, and 9B.

Figure 2:
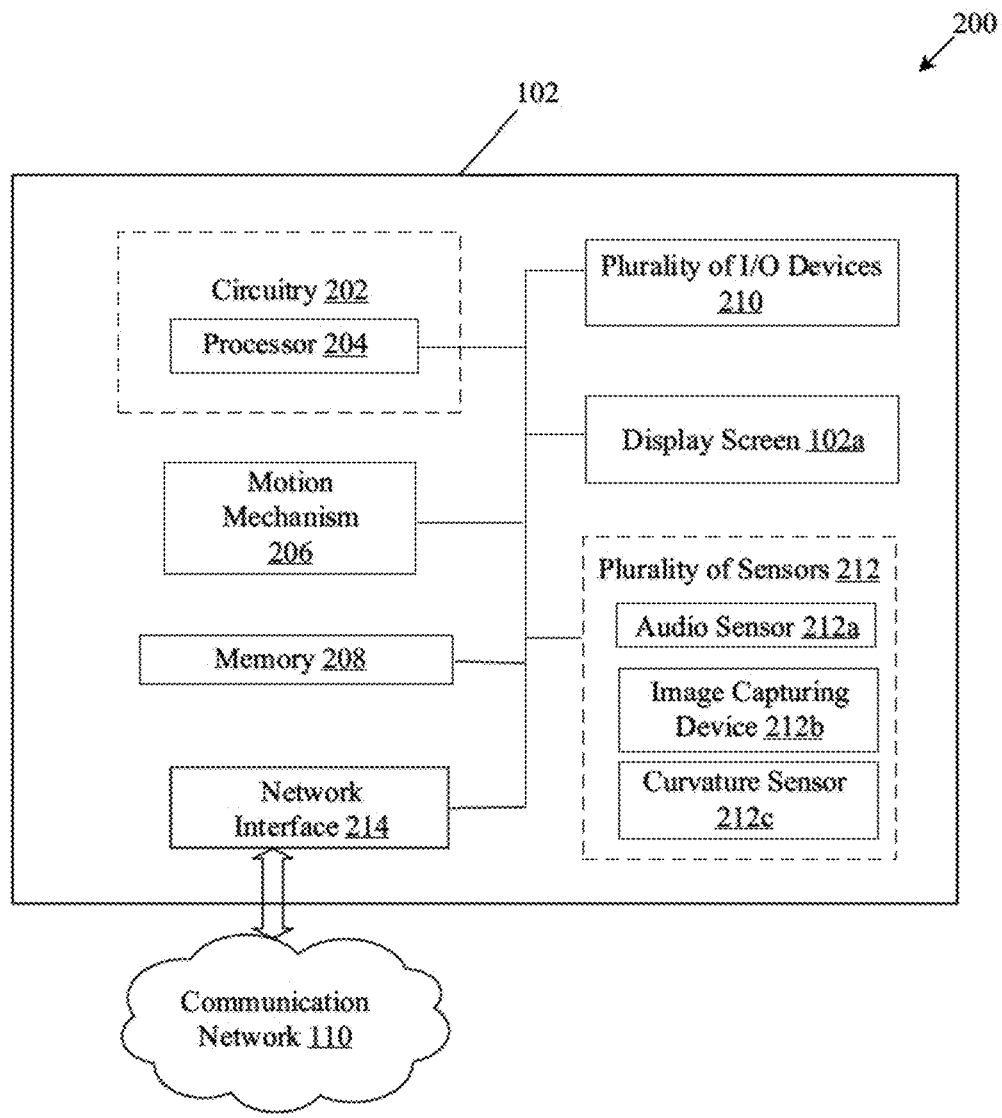
FIG. 2 is a block diagram that illustrates a display apparatus for surface curvature control of a display screen based on motion of support portions, in accordance with an embodiment of the disclosure.

FIG. 2 is a block diagram that illustrates a display apparatus for surface curvature control of a display screen based on motion of support portions, in accordance with an embodiment of the disclosure. FIG. 2 is explained in conjunction with elements from FIG. 1. With reference to FIG. 2, there is shown a block diagram 200 of the display apparatus 102. The display apparatus 102 may include the display screen 102a. The display apparatus 102 may further include circuitry 202 that may include a processor 204. The display apparatus 102 may further include a motion mechanism 206, a memory 208, a plurality of input/output (I/O) devices 210, a plurality of sensors 212, and a network interface 214. The plurality of sensors 212 may include an audio sensor 212a, an image capturing device 212b, and a curvature sensor 212c. The circuitry 202 may be communicatively coupled with the display screen 102a, the motion mechanism 206, the memory 208, the plurality of I/O devices 210, the plurality of sensors 212, and the network interface 214, via a set of communication ports/channels or a channel bus.

The processor 204 may comprise suitable logic, circuitry, and interfaces that may be configured to execute a set of instructions stored in the memory 208. The processor 204 may be configured to control the plurality of I/O devices 210 to receive a user input from the user 112. The processor 204 may be further configured to control the motion of the set of support portions 102b to change the surface curvature of the display screen 102a based on the user input. Examples of the processor 204 may include, but are not limited to, an x86-based processor, an x64-based processor, a Reduced Instruction Set Computing (RISC) processor, an Application-Specific Integrated Circuit (ASIC) processor, and/or a Complex Instruction Set Computing (CISC) processor.

The motion mechanism 206 may be a system of different functional (e.g., a servo motor as an actuator) and non-functional components (e.g., a bracket, a mount, a spring component, or a slide lock) that may be coupled to the set of support portions 102b of the display apparatus 102. The motion mechanism 206 may be configured to receive control signals associated with the motion of the set of support portions 102b from the circuitry 202. The motion mechanism 206 may control the motion of the set of support portions 102b to cause a change in the surface curvature, such as from a flat state to a curved state, of the display screen 102a.

The memory 208 may comprise suitable logic, circuitry, and interfaces that may be configured to store a set of instructions executable by the processor 204. The set of instructions may be associated with the control of the motion of set of support portions 102b of the display apparatus 102. The memory 208 may be configured to store user preferences and user information of the user 112. The user information may include an event calendar of the user 112, user bio-data, past user inputs, favorite display settings, and the like. The user preference may include user's likes and dislikes for type of media content, visual quality, display settings, such as contrast, aspect ratio, screen orientation, and screen curvature. The memory 208 may be further configured to store a surface curvature value that corresponds to the surface curvature of the display screen 102a for each configuration setting of the set of configuration settings. Examples of implementation of the memory 208 may include, but are not limited to, Random Access Memory (RAM), Read Only Memory (ROM), Hard Disk Drive (HDD), and/or a flash drive.

The plurality of I/O devices 210 may comprise suitable logic, circuitry, and interfaces that may be configured to provide an I/O channel/interface between the user 112 and the different operational components of the display apparatus 102. The plurality of I/O devices 210 may receive a user input and present an output to the user 112. The plurality of I/O devices 210 may include various input and output ports to connect various other I/O devices that may communicate with different operational components of the display apparatus 102. Examples of an input device of the plurality of I/O devices 210 may include, but are not limited to, a touch screen, a keyboard/keypad, a set of buttons, a mouse, a joystick, and/or a microphone. Examples of an output device of the plurality of I/O devices 210 may include, but are not limited to, a display device (for example, the display screen 102a), a speaker, and a haptic or a sensory output device.

The plurality of sensors 212 may comprise suitable logic, circuitry, and interface that may be configured to detect different parameters related to the user 112 and the display apparatus 102. Examples of the different parameters may include, but are not limited to, a user position with respect to the display apparatus 102, a user posture, a facial expression of the user 112, or a surface curvature of the display apparatus 102. The plurality of sensors 212 may include the audio sensors 212a, the image capturing device 212b, and the curvature sensor 212c.

The audio sensor 212a may be configured to capture voice data of the user 112. The audio sensor 212a may include a microphone or a set of microphones to capture voice data of the user 112. The captured voice data may act as the user input or may be used to determine the position of the user 112 with respect to a position of the display apparatus 102.

The image capturing device 212b may be configured to capture a plurality of images of a scene in field-of-view (FOV) of the image capturing device 212b. The plurality of images may be captured to determine a number of viewers of the display screen 102a, a user position, a distance of the user 112 from the display apparatus 102, an orientation of the user 112, a posture of the user 112 with respect to the display apparatus 102, a facial expression of the user 112, a mood of the user 112, or other user information. The image capturing device 212b may be positioned at a particular location on or around the display apparatus 102 to capture the plurality of image frames. Examples of the image capturing device 212b may include, but are not limited to, an image sensor, a wide-angle camera, depth sensor, a motion sensor, an action camera, a camcorder, a time-of-flight camera (TOF camera), an Infrared (IR) sensor, a thermal sensor, a night-vision camera, a position sensor, a posture sensor, and/or other image capturing devices.

The curvature sensor 212c may comprise suitable logic, circuitry, and interfaces that may be configured to determine a current level of the surface curvature of the display screen 102a. The curvature sensor 212c may be attached to the display screen 102a. Alternatively, the curvature sensor 212c may be embedded or integrated in one or more layers of the display screen 102a. Examples of the curvature sensor 212c may include, but are not limited to, a flexible resistance sensor, a potentiometer-based sensor, and/or a pressure or stress-based sensor.

The network interface 214 may comprise suitable logic, circuitry, and interfaces that may be configured to establish a communication between the display apparatus 102 and different communication devices, such as the data store 108, via the communication network 110. The network interface 214 may implement known technologies to support wireless communication. The network interface 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The operations executed by the processor 204 of the display apparatus 102 are further described in detail, for example, in the FIGS. 3, 4A, 4B, 5A, 5B, 6A, 6B, 7A, 7B, 8, 9A, and 9B.

Figure 3:
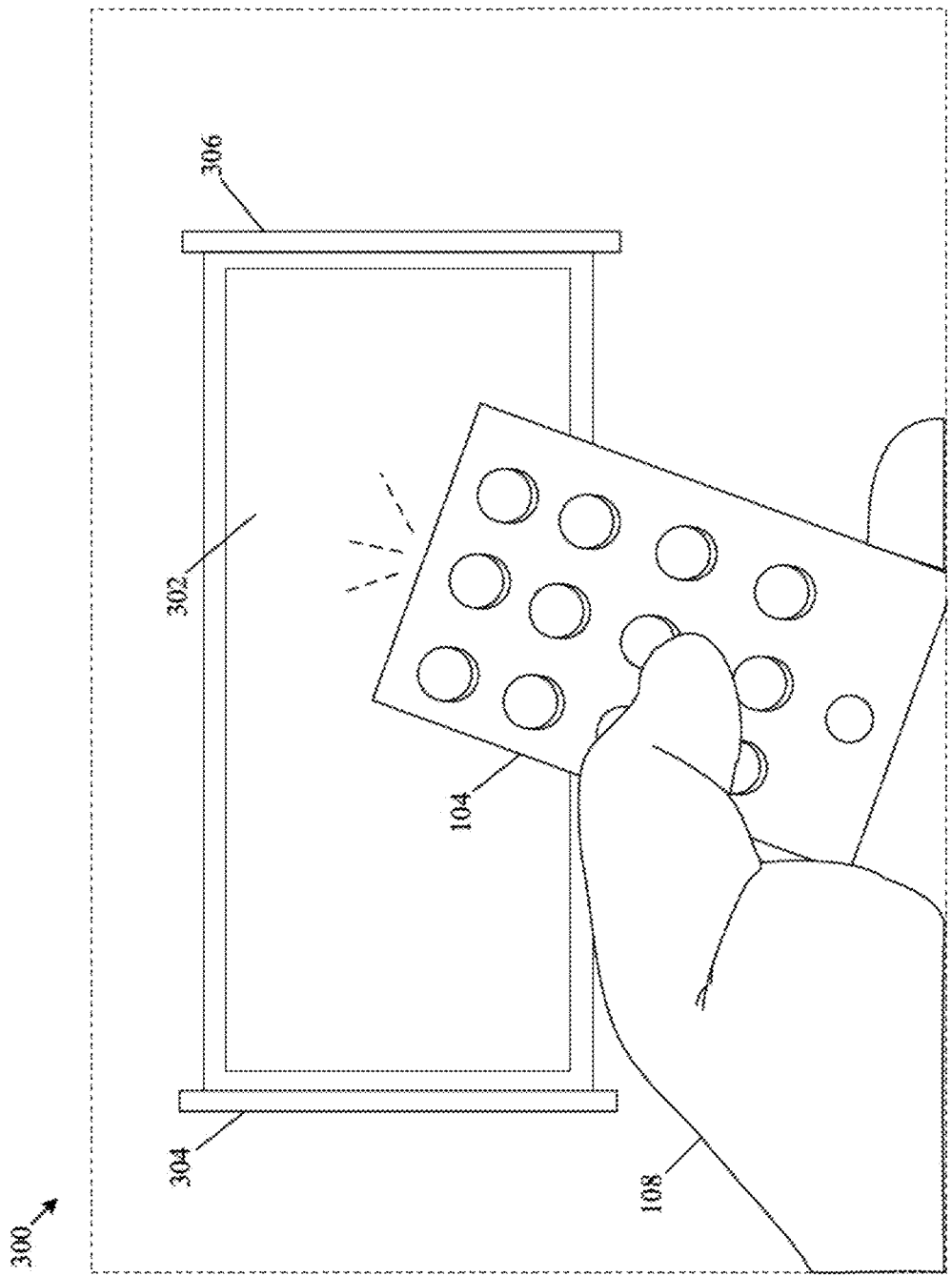
FIG. 3 illustrates an exemplary scenario for a surface curvature control of a display screen based on a user input, in accordance with an embodiment of the disclosure.

FIG. 3 illustrates an exemplary scenario for a surface curvature control of a display screen based on a user input, in accordance with an embodiment of the disclosure. FIG. 3 is explained in conjunction with elements from FIGS. 1 and 2. With reference to FIG. 3, there is shown an exemplary scenario 300 for implementation of the display apparatus 102. In this exemplary scenario 300, there is shown a display screen 302 coupled to a set of support portions, such as a first support portion 304 and a second support portion 306. The first support portion 304 and the second support portion 306 may correspond to the set of support portion 102b (see FIG. 1). The first support portion 304 and the second support portion 306 may be coupled to either ends of the display screen 302 of the display apparatus 102. The first support portion 304 and the second support portion 306 may help to at least align, balance the weight, or act as a mount for the display screen 302 on a structural member, such as a wall, a ceiling, or a floor, of the installation environment.

In the exemplary scenario 300, the processor 204 may be configured to receive a user input via the external device 104, such as a TV remote. The external device 104 may be paired with the display apparatus 102. As an example, the user input may be received based on a user preference to watch media content (e.g., a favorite TV show) on the display apparatus 102. The user input may be received as a voice command via a microphone of the external device 104.

The processor 204 may be further configured to display a set of configuration settings on the display screen 302 of the display apparatus 102. The set of configuration settings may include, but are not limited to, a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, or a default mode. Each mode may correspond to a pre-stored surface curvature value, such as a curvature radius of "4000 mm", "3000 mm", "1800 mm", of the display screen 302.

As an example, the wallpaper mode may correspond to a zero surface curvature (or an infinite curvature radius) and the gaming mode may correspond to a small surface curvature value, such as a curvature radius of "1800 mm". The processor 204 may be configured to select a configuration setting of the displayed set of configuration settings based on the user input. The user input may include a user selection of the configuration setting on the display screen 302, via the external device 104.

As another example, the display screen 302 may be in a flat state that may correspond to a cinema mode, in which an entire family may be engaged in a movie displayed on the display screen 302. The cinema mode may correspond to a zero surface curvature value for the display screen 302 as multiple viewers may watch the movie and a surface curvature may block a view of one or more users of the family and further affect the user experience. The zero surface curvature value may be pre-stored in the memory 208 of the display apparatus 102.

At a particular time, the processor 204 may be configured to receive the user input that may correspond to a user request to load a game. The processor 204 may be configured to select the configuration setting, i.e. the gaming mode, for the display screen 302. The gaming mode may correspond to a defined value of the surface curvature of the display screen 302. The processor 204 may be further configured to control the motion of the first support portion 304 and the second support portion 306 such that the surface curvature matches the defined value for the gaming mode. More specifically, the processor 204 may be configured to control actuators (of the motion mechanism 206) coupled to the first support portion 304 and the second support portion 306. The actuators of the motion mechanism 206 may drive the first support portion 304 and the second support portion 306 to change the surface curvature in accordance with the gaming mode.

In accordance with an embodiment, the processor 204 may be configured to compute a surface curvature value based on the configuration setting selected by the user 112. The processor 204 may be configured to control the motion of the first support portion 304 and the second support portion 306. The motion of the first support portion 304 and the second support portion 306 may cause a change in the surface curvature of the display screen 302 based on the computed surface curvature value.

Figure 4A:
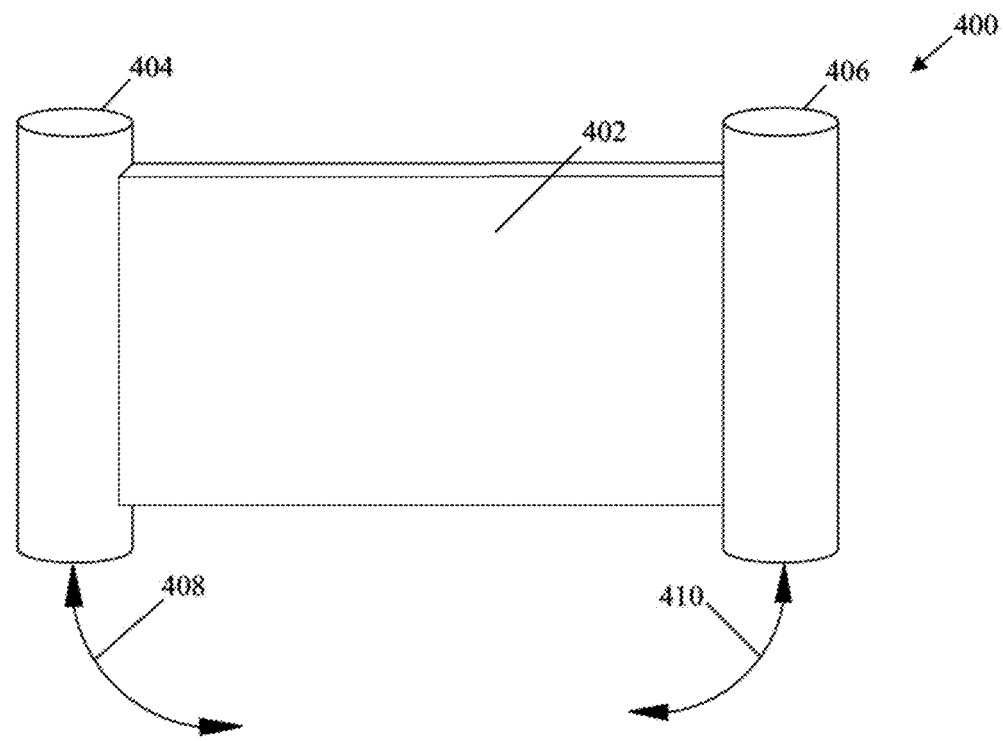
FIGS. 4A and 4B, collectively, illustrate an exemplary scenario for surface curvature control of a display screen based on motion of support portions, in accordance with an embodiment of the disclosure.
Figure 4B:
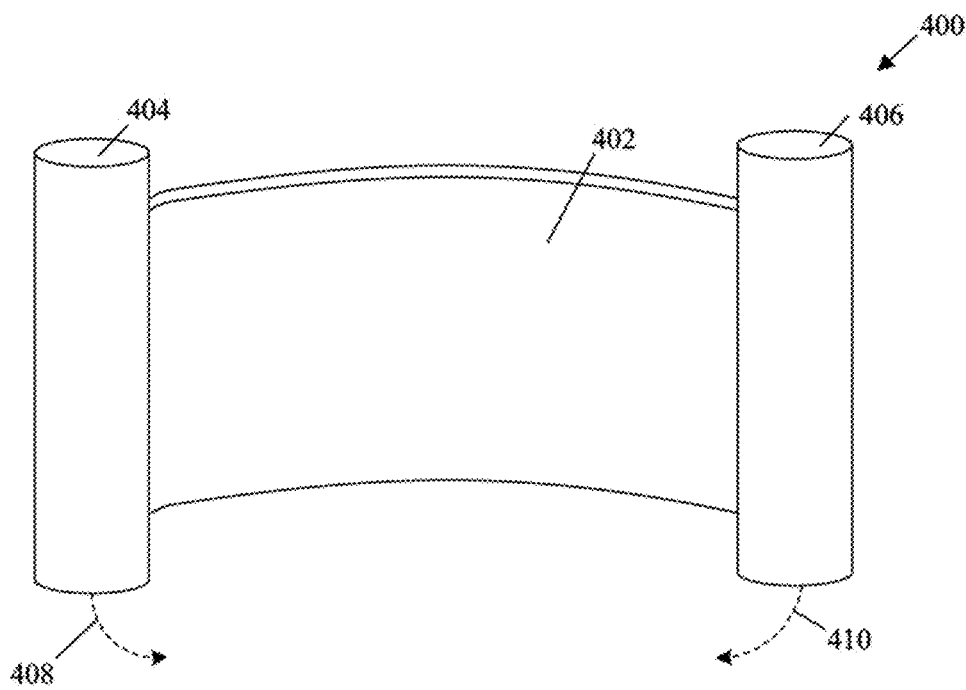

FIGS. 4A and 4B, collectively, illustrate a first exemplary scenario for surface curvature control of a display screen based on motion of support portions, in accordance with an embodiment of the disclosure. FIG. 4 is explained in conjunction with elements from FIGS. 1, 2, and 3. With reference to FIGS. 4A and 4B, there is shown a first exemplary scenario 400.

In the first exemplary scenario 400, there is shown a display screen 402 and a set of support portions, such as a first support portion 404 and a second support portion 406. The display screen 402 may be same as the display screen 102a of the display apparatus 102. The display screen 402 may be between the first support portion 404 and the second support portion 406. There is further shown a first path 408 for the motion of the first support portion 404 and a second path 410 for the motion of the second support portion 406. The first path 408 and the second path 410 may curve inwards. The processor 204 may be configured to control the motion of at least the first support portion 404 and the second support portion 406, forward or backward along the first path 408 and the second path 410, respectively.

In the first exemplary scenario 400, the display apparatus 102 may be in a flat state (as shown in FIG. 4A) with a zero surface curvature. The surface curvature of the display screen 402 may change as the first support portion 404 and the second support portion 406 move forward or backward on the first path 408 and the second path 410, respectively. The change in the surface curvature of the display screen 402 may be based on at least the motion of the first support portion 404 on the first path 408 or the motion of the second support portion 406 on the second path 410. For example, the radius of curvature or the angle of curvature may decrease as the first support portion 404 and/or the second support portion 406 may move forward. Also, the radius of curvature or the angle of curvature may increase as the first support portion 404 and/or the second support portion 406 may move backward. The processor 204 may be configured to receive the user input to change the surface curvature of the display screen 402, via the plurality of I/O devices 210. Based on the received user input, the processor 204 may be further configured to control the actuators (of the motion mechanism 206) to drive at least the first support portion 404 and the second support portion 406 forward or backward along the first path 408 and the second path 410, respectively.

In accordance with an embodiment, the processor 204 may be configured to control the motion of each of the support portion of the first support portion 404 and the second support portion 406. A forward or backward displacement of the first support portion 404 on the first path 408 may be equal to a forward or backward displacement of the second support portion 406 on the second path 410. This may result in a uniform surface curvature (as shown in FIG. 4B) of the display screen 402.

In accordance with an embodiment, at a particular time, a displacement of the first support portion 404 may be different from a displacement of the second support portion 406. For example, the processor 204 may be configured to determine that the user 112 is seated near the first support portion 404. In order to center-align the display screen 402, the processor 204 may be configured to control the motion of the first support portion 404 and the second support portion 406 such that a displacement of the second support portion 406 on the second path 410 may be more than the displacement of the first support portion 404 on the first path 408. This may rotate and center align the display screen 402 with respect to the user position.

Figure 5A:
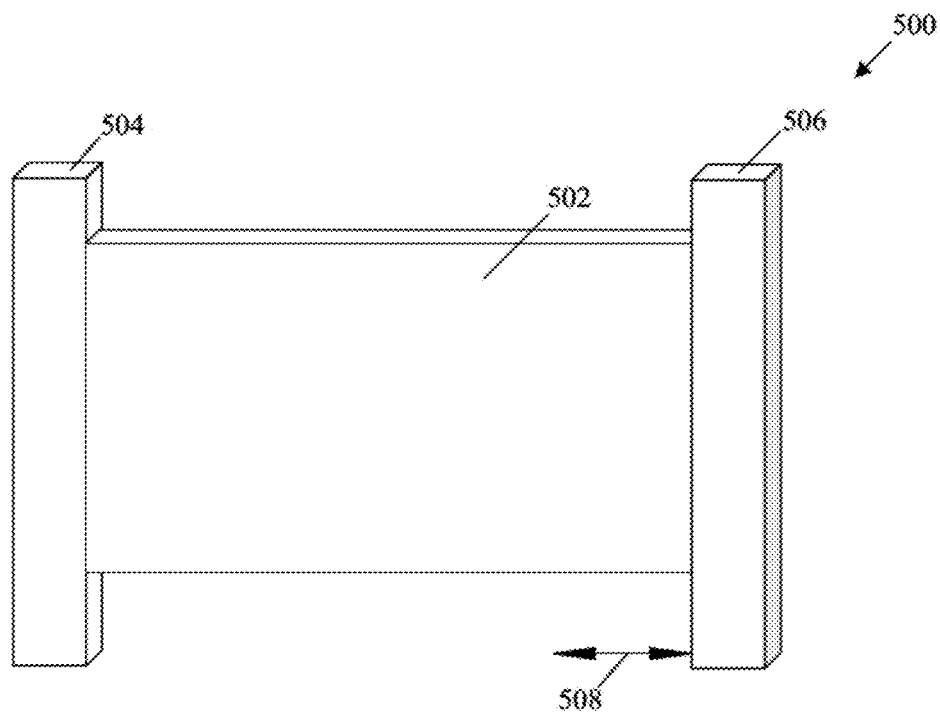
FIGS. 5A and 5B, collectively illustrate an exemplary scenario for surface curvature control of a display screen based on motion of support portions, in accordance with an embodiment of the disclosure.
Figure 5B:
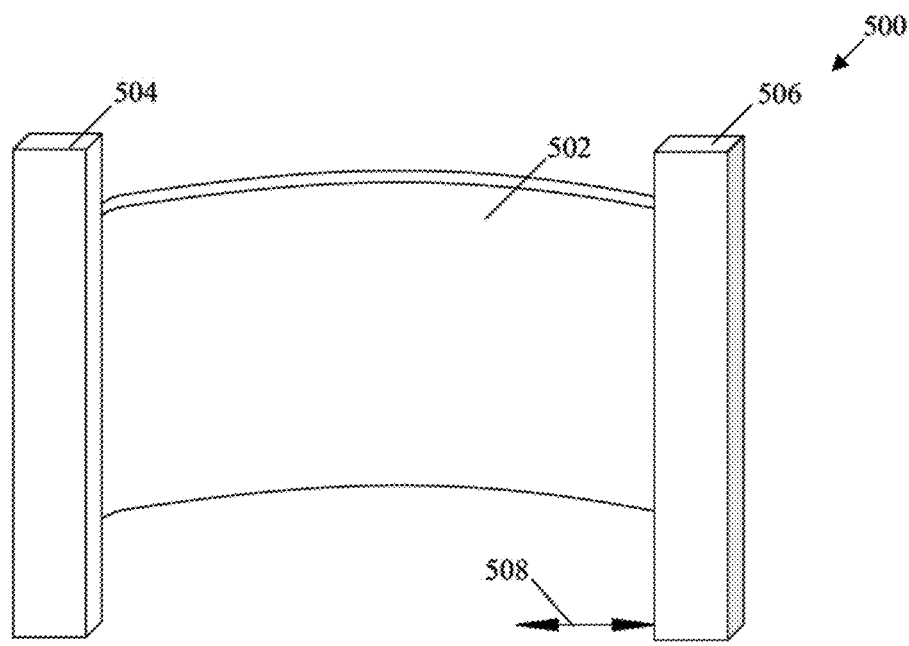

FIGS. 5A and 5B, collectively illustrate a second exemplary scenario for surface curvature control of a display screen based on motion of support portions, in accordance with an embodiment of the disclosure. FIGS. 5A and 5B are explained in conjunction with elements from FIGS. 1, 2, 3, 4A, and 4B. With reference to FIGS. 5A and 5B, there is shown a second exemplary scenario 500.

In the second exemplary scenario 500, there is shown a display screen 502 of the display apparatus 102 and a set of support portions, such as a first support portion 504 and a second support portion 506. The display screen 502 may be same as the display screen 102a. The first support portion 504 may be movable along a linear path 508, which may be a straight line between the first support portion 504 and the second support portion 506. In a flat state (as shown in FIG. 5A) of the display screen 502 where the surface curvature of the display screen 502 may be zero, the first support portion 504 may be at a first end of the linear path 508. The surface curvature of the display screen 502 may change (as shown in FIG. 5B) as the first support portion 504 may move inwards along the linear path 508. More specifically, the radius of curvature or the angle of curvature may decrease as the first support portion 504 may move inwards along the linear path 508. Also, the second support portion 506 may remain stationary while the first support portion 504 moves inwards along the linear path 508.

In accordance with an embodiment, the processor 204 may be configured to control the motion of the first support portion 504 on the linear path 508 to change the surface curvature of the display screen 502. A mid portion of the display screen 502 may shift backwards and curve the display screen 502, as the first support portion 504 moves on the linear path 508.

Figure 6A:
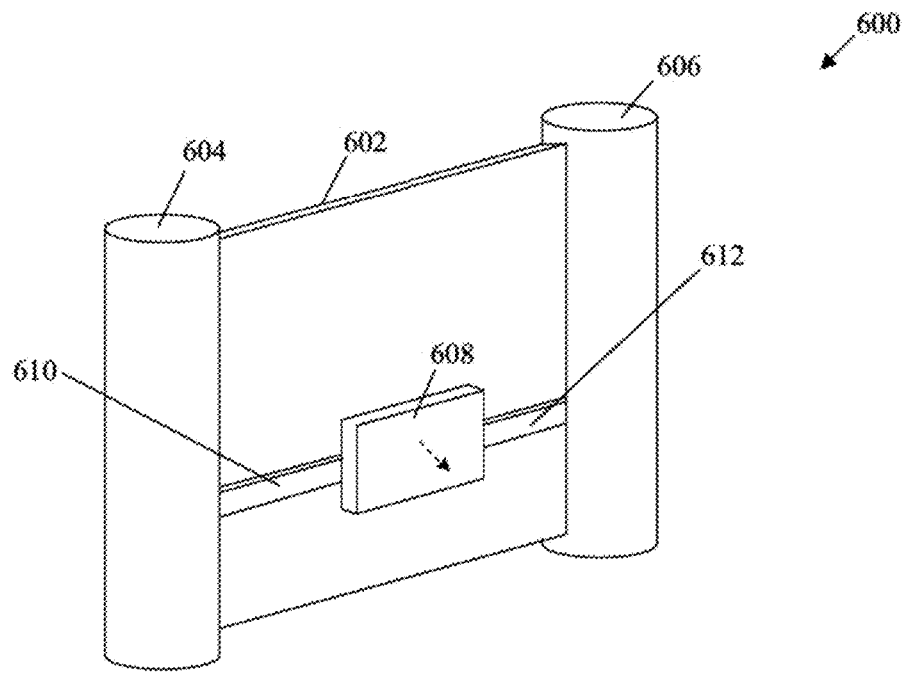
FIGS. 6A and 6B, collectively, illustrate an exemplary scenario for surface curvature control of a display screen based on motion of support portions, in accordance with an embodiment of the disclosure.
Figure 6B:
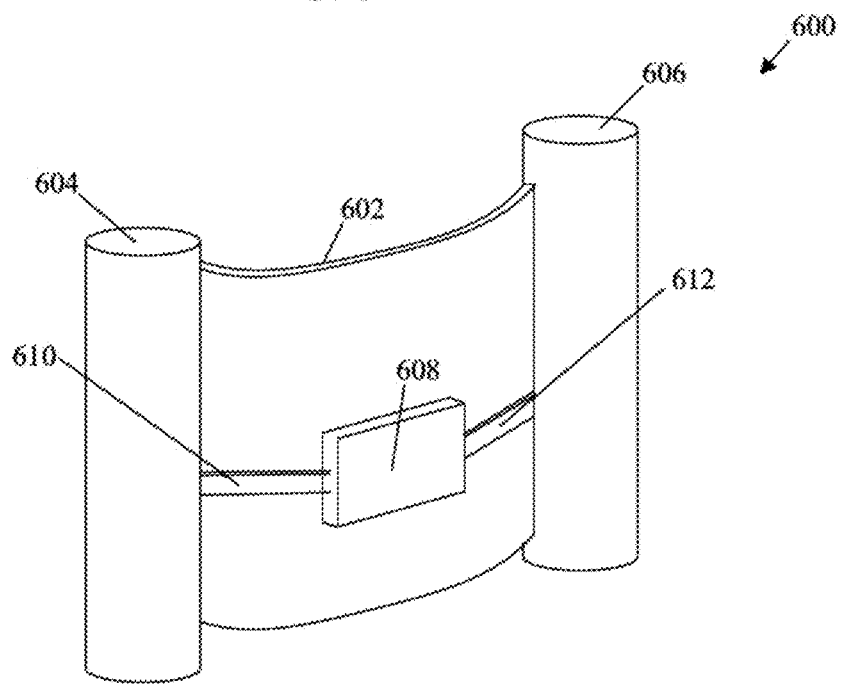

FIGS. 6A and 6B, collectively, illustrate a third exemplary scenario for surface curvature control of a display screen based on motion of support portions, in accordance with an embodiment of the disclosure. FIG. 6 is explained in conjunction with elements from FIGS. 1, 2, 3, 4A, 4B, 5A, and 5B. With reference to FIG. 6, there is shown a third exemplary scenario 600.

In the third exemplary scenario 600, there is shown a display screen 602 of the display apparatus 102 and a set of support portions, such as a first support portion 604 and a second support portion 606. The display screen 602 may be coupled to the first support portion 604 and the second support portion 606. The display apparatus 102 may further include an actuator 608, a first panel 610 and a second panel 612 attached to a back side of the display screen 602. The first panel 610 may connect the actuator 608 to the first support portion 604 and the second panel 612 may connect the actuator 608 to the second support portion 606.

The processor 204 may be configured to control the actuator 608 to drive the first panel 610 and the second panel 612 such that the first support portion 604 and the second support portion 606 move towards each other. The movement of the first support portion 604 and the second support portion 606 causes a change in the surface curvature of the display screen 602. The actuator 608 may be a linear actuator or a rotary actuator, such as a motor. The distance between the first support portion 604 and the second support portion 606 may decrease with the change in the surface curvature of the display screen 602. In case the user input corresponds to a flat state (as shown in FIG. 6A) of the display screen 602 (i.e. a change from a curved state (as shown in FIG. 6B) to the flat state), the distance between the first support portion 604 and the second support portion 606 may increase.

Figure 7A:
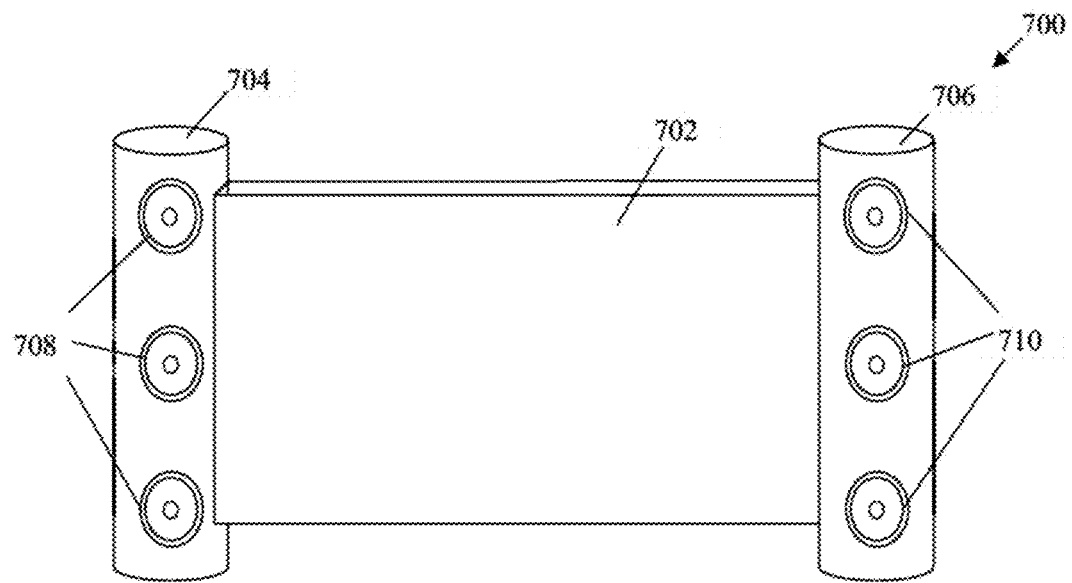
FIGS. 7A and 7B, collectively, illustrate an exemplary scenario for surface curvature control of a display screen based on motion of support portions, in accordance with an embodiment of the disclosure.
Figure 7B:
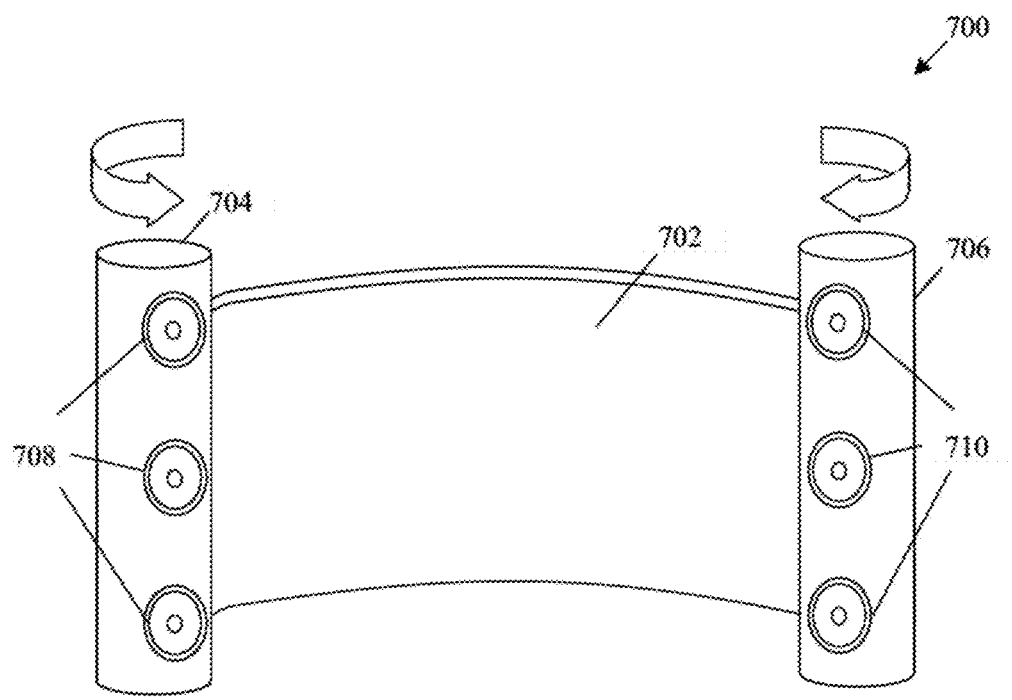

FIGS. 7A and 7B, collectively, illustrate a fourth exemplary scenario for surface curvature control of a display screen based on motion of support portions, in accordance with an embodiment of the disclosure. FIGS. 7A and 7B is explained in conjunction with elements from FIGS. 1, 2, 3, 4A, 4B, 5A, 5B, 6A, and 6B. With reference to FIGS. 7A and 7B, there is shown a fourth exemplary scenario 700.

In the fourth exemplary scenario 700, there is shown a display screen 702 of the display apparatus 102 and a set of support portions, such as a first support portion 704 and a second support portion 706 coupled to the display screen 702. The processor 204 may be configured to control the motion of the first support portion 704 in a first direction and the motion of the second support portion 706 in a second direction. The first direction may be different from the second direction. The first support portion 704 and the second support portion 706 may be directly coupled to at least one actuator that may be responsible for the motion of the first support portion 704 and the second support portion 706.

In the fourth exemplary scenario 700, there is further shown a set of speakers, such as a first speaker 708 and a second speaker 710 coupled to the first support portion 704 and the second support portion 706, respectively. The display screen 702 may be between the first speaker 708 and the second speaker 710. The first speaker 708 and the second speaker 710 may correspond to the set of speakers 106 (See FIG. 1).

The processor 204 may be configured to control motion of the set of speakers 106. The control of the motion of the set of speakers 106 may correspond to the control of the motion of the first support portion 704 and the second support portion 706. The motion of the first speaker 708 and the second speaker 710 may be a rotational motion that may be controlled such that an angle of rotation of the first speaker 708 equals an angle of rotation of the second speaker 710. The motion of the first speaker 708 may be in the first direction and the motion of the second speaker 710 may be in the second direction. For example, as shown in FIG. 7B, the first direction may be anticlockwise direction of motion and the second direction may be clockwise direction of motion. The first speaker 708 and the second speaker 710 may rotate to change the surface curvature of the display screen 702. The change in the surface curvature may be from a flat state (as shown in FIG. 7A) of the display screen 702 to a curved state (as shown in FIG. 7B).

Figure 8:
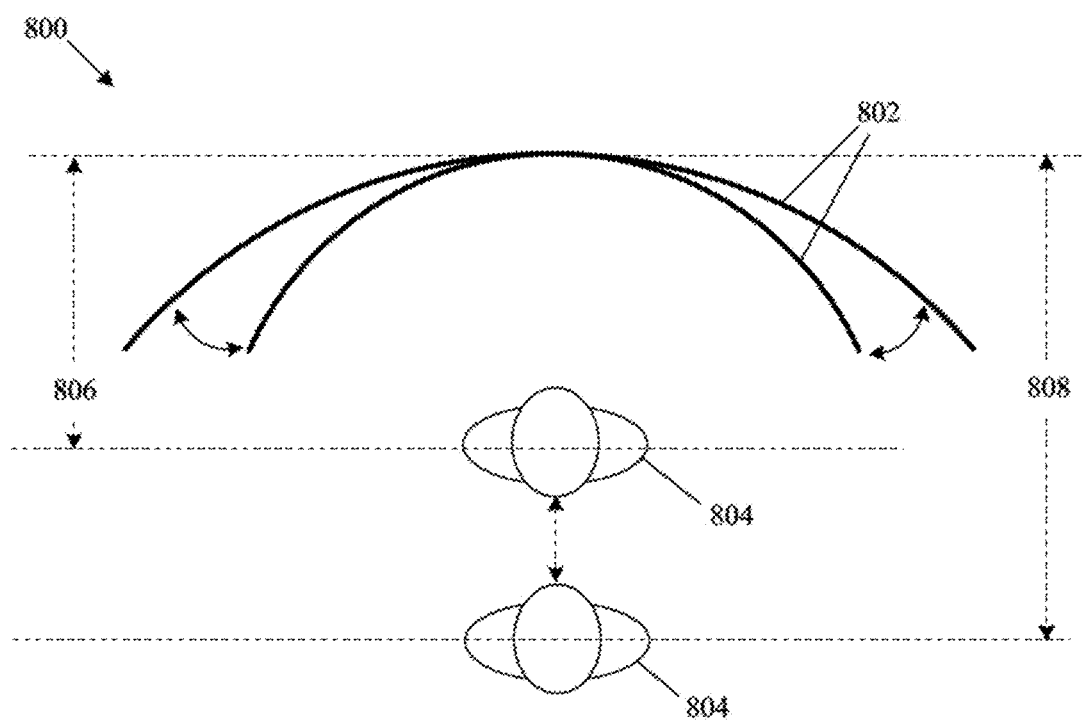
FIG. 8 illustrates an exemplary scenario for surface curvature control of a display screen based on motion of support portions, in accordance with an embodiment of the disclosure.

FIG. 8 illustrates a fifth exemplary scenario for surface curvature control of a display screen based on motion of support portions, in accordance with an embodiment of the disclosure. FIG. 8 is explained in conjunction with elements from FIGS. 1, 2, 3, 4A, 4B, 4B, 5A, 5B, 6A, 6B, 7A, and 7B. With reference to FIG. 8, there is shown a fifth exemplary scenario 800. In the fifth exemplary scenario 800, there is shown a display screen 802 and a viewer 804 in vicinity of the display screen 802. It may be noted that the viewer 804 may also be the user associated with the display screen 802.

The processor 204 may be configured to determine at least one of a posture of the viewer 804 or a distance of the viewer 804 from the display screen 802. The processor 204 may be further configured to control the motion of a set of support portions (such as the set of support portion 102b) based on at least the determined posture of the viewer 804 or the determined distance of the viewer 804 from the display screen 802. For example, the viewer 804 may be initially present at a distance 806 from the display screen 802. After a specific period, the viewer 804 may move back to a distance 808 from the display screen 802. As the distance 808 is more than the distance 806, the surface curvature of the display screen 802 may need to be adjusted for a suitable viewing experience. The processor 204 may be configured to control the motion of the set of support portions to change the surface curvature of the display screen 802. In this case, the radius of curvature increases as the viewer 804 moves back to the distance 808 from the display screen 802 and the radius of curvature decreases as the viewer 804 moves to the front of the display screen 802 at the distance 806.

In accordance with an embodiment, the processor 204 may be further configured to adjust the display of the media content on the display screen 802 based on the change in the surface curvature of the display screen 802. The adjustment of the display of the media content may correspond to an adjustment of a set of display attributes of the media content. For example, as the surface curvature changes, the processor 204 may be configured to adjust an aspect ratio of the media content on the display screen 802. The adjustment of the aspect ratio may be suitable for the viewer 804 to watch the media content from the distance 808.

Figure 9A:
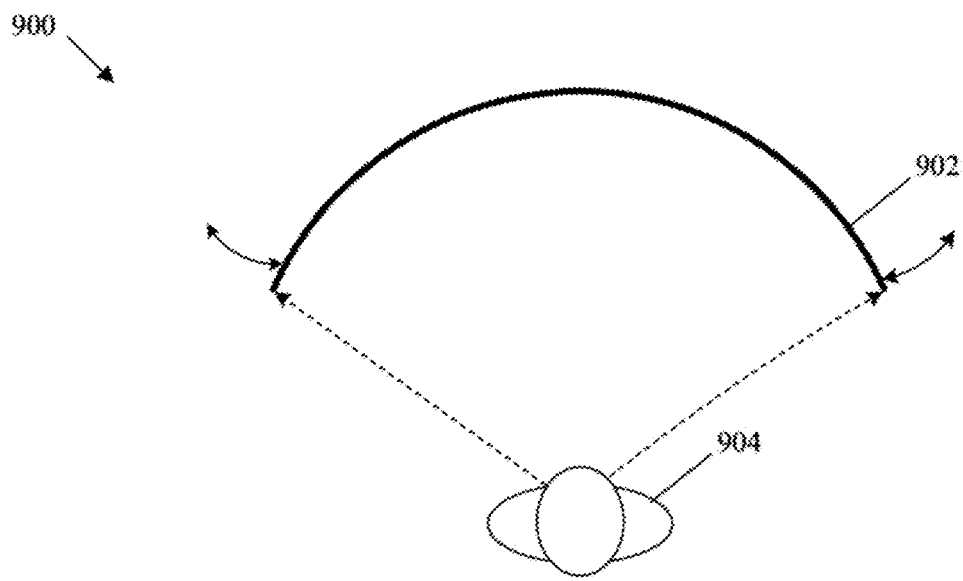
FIGS. 9A and 9B, collectively, illustrate an exemplary scenario for surface curvature control of a display screen based on motion of support portions, in accordance with an embodiment of the disclosure.
Figure 9B:
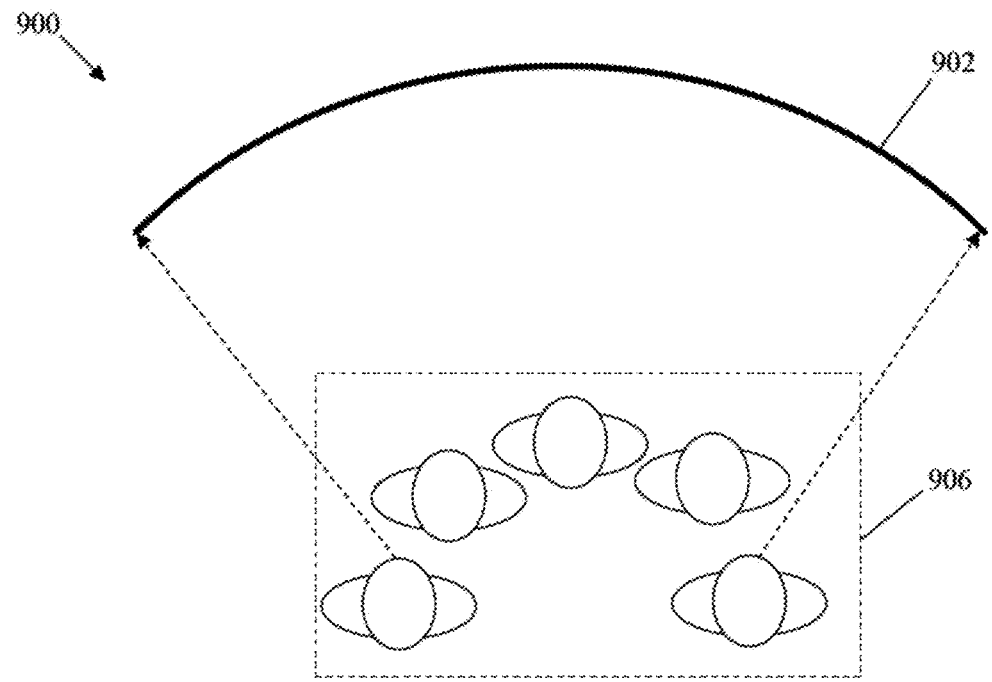

FIGS. 9A and 9B, collectively, illustrate a sixth exemplary scenario for surface curvature control of a display screen based on motion of support portions, in accordance with an embodiment of the disclosure. FIGS. 9A and 9B are explained in conjunction with elements from FIGS. 1, 2, 3, 4A, 4B, 5A, 5B, 6A, 6B, 7A, 7B, and 8. With reference to FIGS. 9A and 9B, there is shown a sixth exemplary scenario 900. In the sixth exemplary scenario 900, there is shown a display screen 902 and a viewer 904 in vicinity of the display screen 902.

The processor 204 may be configured to detect a number of viewers associated with the display screen 902. The number of viewers may change in real time. The processor 204 may be configured to control the motion of a set of support portions (such as the set of support portions 102b) to change the surface curvature of the display screen 902 based on the detected number of viewers. As shown in the sixth exemplary scenario 900, there may be only a viewer 904 of the display screen 902. After a particular time period, there may be a plurality of viewers 906 associated with the display screen 902. The processor 204 may be configured to detect the number of viewers at every time step. For example, as the detected number of viewers increase from "1" viewer to "5" viewers, the processor 204 may be configured to control the set of support portions coupled to the display screen 902 to increase the radius of curvature of the display screen 902. The increased radius of curvature may facilitate the plurality of viewers 906 to seamlessly watch the media content on the display screen 902, without a need of a change in a position of each of the plurality of viewers 906.

Few exemplary scenarios for the implementation of the display apparatus 102 are herein described. In one exemplary scenario, the processor 204 may be configured to retrieve a plurality of images captured by the image capturing device 212b. The processor 204 may be further configured to determine user information of the number of viewers of the display screen 902. The user information may include, but not limited to, relative user positions with respect to a position of the display screen 902, a distance from the display screen 902, and postures of the plurality of viewers 906. The user information may further include details of mood associated with the viewer 904 of the display screen 902. The mood may be specified by different sentiments and/or emotional states that may include, but are not limited to, a happy state, a sad state, an angry state, a calm state, a neutral state, an excited state, a confused state, a stressed state, a disgusted state, a surprised state, an excitement state, and a scared state. The processor 204 may be configured to determine the mood of the viewer 904 and control the motion of the set of support portions based on the determined mood. For example, the processor 204 may determine that the viewer 904 is in a stressed state. The processor 204 may control the motion of the set of support portions such that the display screen 902 corresponds to a user-preferred mode.

The user information may further include details of events associated with the viewer 904 of the display screen 902. The events related to the viewer 904 may include, but are not limited to, a dance party, a musical event, a birthday celebration, an official meeting, a gaming event, or a karaoke party. The processor 204 may be configured to determine an upcoming event related to the viewer 904 and control the motion of the set of support portions based on the determined event.

The processor 204 may be further configured to determine the user position based on which a distance of the viewer 904 from the display apparatus 102 may be determined. The captured plurality of images may be utilized to determine an orientation of the viewer 904 based on which a posture of the viewer 904 may be determined with respect to the display apparatus 102. The captured plurality of images may be utilized to determine a facial expression of the viewer 904 to determine the mood of the viewer 904. The facial expression may be indicated by a motion of muscles on the face to manifest an emotion. The processor 204 may be configured to control the motion of the set of support portions based on the user information associated with the viewer 904 of the display screen 902.

In another exemplary scenario, the processor 204 may be configured to control the motion of the set of support portions based on a playback of the media content on the display screen 902. The processor 204 may be configured to determine a type of media content that is being played back on the display screen 902. The processor 204 may be further configured to control the motion of the set of support portions such that the surface curvature of the display screen 102a correspond to the most preferable state of the type of media content. For example, the most preferable state for playback of a movie may be a flat state of the display screen 902. The processor 204 may be configured to control the motion of the set of support portions such that the surface curvature of the display screen 902 correspond to the flat state.

In another exemplary scenario, the processor 204 may be configured to control the motion of the set of support portions based on date-time information of display of the media content on the display screen 902. Date-time information may correspond to a time of a day, a day of the week, or a date. For example, a TV show that the viewer 904 watches may be broadcasted at a particular time of the day (e.g. at "9 PM" primetime). The processor 204 may be configured to control the motion of the set of support portions at the particular time such that the display screen 902 is in a state that is preferable for the display of the TV show. Alternatively, at 2 pm every day, the processor 204 may be configured to control the motion of the set of support portions such that the display screen 902 is in a flat state to avoid reflection or glare of the sun.

In another exemplary scenario, the processor 204 may be configured to control the motion of the set of support portions based on user preferences that may be stored in the memory 208. The user preference may include user's likes and dislikes for type of media content, visual quality, display settings, such as contrast, aspect ratio, screen orientation, and screen curvature. For example, for the viewer 904 who prefers to use the display apparatus 102 for gaming, the processor 204 may control the motion of the set of support portions such that the display screen 902 may be configured in accordance with the gaming mode.

In another exemplary scenario, the display apparatus 102 may be configured to compute a new level of the surface curvature of the display screen 902, based on the user input. The display apparatus 102 may be further configured to control the motion of the set of support portions to change the surface curvature of the display screen 902 to match the computed new level of the surface curvature. The new level of the surface curvature may be computed based on a plurality of factors. The plurality of factors may include, but not limited to, the user preferences, the user information, the number of viewers of the display screen 902, and/or date-time information for the display of the media content.

Figure 10:
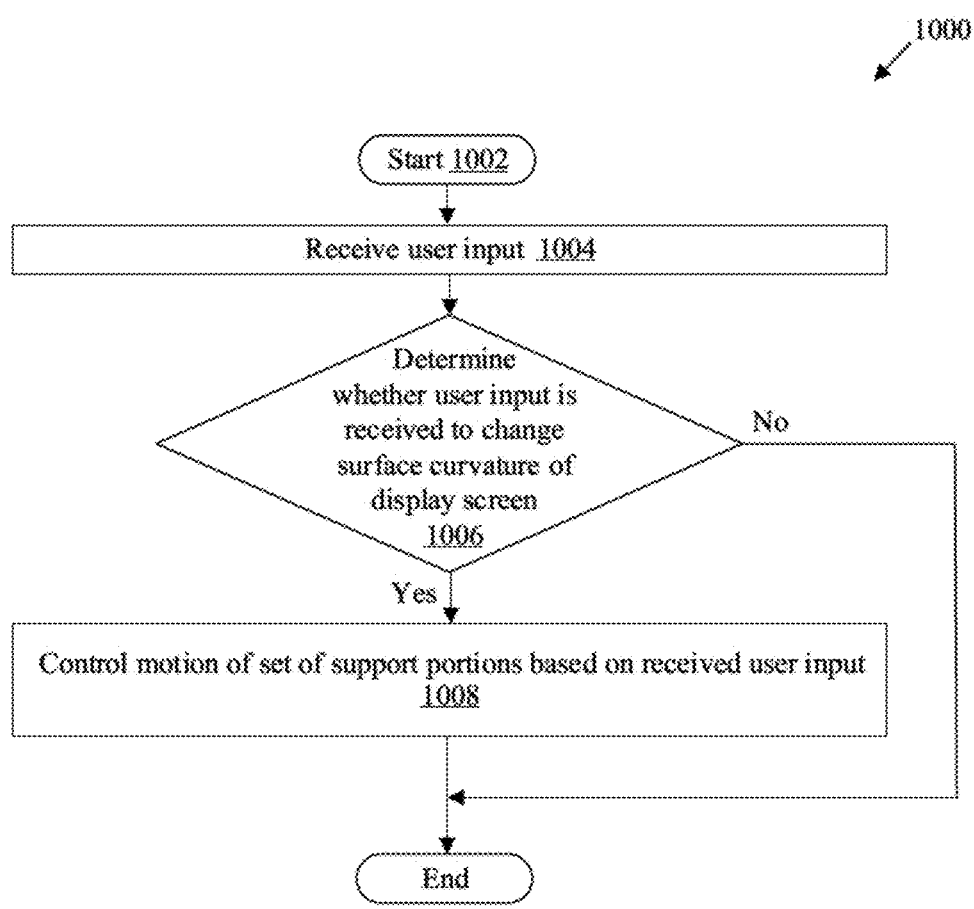
FIG. 10 depicts a flowchart that illustrates an exemplary method for surface curvature control of a display screen based on motion of support portions, in accordance with an embodiment of the disclosure.

FIG. 10 depicts a flowchart that illustrates an exemplary method for surface curvature control of a display screen based on motion of support portions, in accordance with an embodiment of the disclosure. With reference to FIG. 10, there is shown a flowchart 1000. The flowchart 1000 is described in conjunction with FIGS. 1, 2, 3, 4A, 4B, 5A, 5B, 6A, 6B, 7A, 7B, 8, and 9. The operations from 1002 to 1010 may be implemented in the display apparatus 102. The operations of the flowchart 1000 may start at 1002 and proceed to 1004.

At 1004, a user input may be received. In accordance with an embodiment, the processor 204 may be configured to receive the user input via the plurality of I/O devices 210. The user input may be a touch input, a gesture input, a voice command, or other inputs types.

At 1006, it may be determined whether the user input is received to change a surface curvature of the display screen 102a. In accordance with an embodiment, the processor 204 may be configured to determine whether the user input is received to change the surface curvature of the display screen 102a. In case the user input is received to change the surface curvature of the display screen 102a, control passes to 1008. Otherwise, control passes to end.

At 1008, motion of the set of support portions 102b may be controlled based on the received user input. In accordance with an embodiment, the processor 204 may be configured to control the motion of the set of support portions 102b based on the received user input. The motion of the set of support portions 102b may correspond to at least a linear motion, a non-linear motion, or a combination of the linear motion and the non-linear motion of the set of support portions 102b along a defined path. The motion of the set of support portions 102b may correspond to a change in the surface curvature of the display screen 102a. The change in surface curvature may correspond to a change in the angle of surface curvature and the radius of surface curvature of the display screen 102a. In accordance with an embodiment, the user input may include the selection of a configuration setting that corresponds to a configuration of the display screen 102a. The processor 204 may be configured to control the motion of the set of support portions 102b based on the selected configuration setting. As an example, the processor 204 may be configured to transmit control signals to the motion mechanism 206 that may drive the set of support portions 102b based on the selected configuration setting. Control passes to end.

Various embodiments of the disclosure provide a display apparatus (e.g. display apparatus 102). The display apparatus 102 may include a display screen (e.g. the display screen 102a) and a set of support portions (e.g. the set of support portions 102b). The display screen 102a may be coupled to the set of support portions 102b. The display apparatus 102 may further include circuitry (e.g. the circuitry 202) configured to receive a user input that corresponds to a configuration of the display screen 102a. The circuitry may be further configured to control motion of the set of support portions 102b based on the received user input. The change in a surface curvature of the display screen 102a may be based on the motion of the set of support portions 102b. In accordance with an embodiment, the motion of the set of support portions 102b may correspond to at least a linear motion, a non-linear motion, or a combination of the linear motion and the non-linear motion of the set of support portions 102b along a defined path.

In accordance with an embodiment, the set of support portions 102b may include a first support portion (e.g. the first support portion 304) and a second support portion (e.g. the second support portion 306). The display screen 102a may be between the first support portion 304 and the second support portion 306.

In accordance with an embodiment, the circuitry 202 may be further configured to control the motion of the first support portion 304 in a first direction and control the motion of the second support portion 306 in a second direction. The first direction may be different from the second direction.

In accordance with an embodiment, the first support portion 304 may be on a first path (e.g. the first path 408) and the second support portion 306 may be on a second path (e.g. the second path 410). The first path 408 and the second path 410 may curve towards each other. The change in the surface curvature of the display screen 102a may be further based on at least the motion of the first support portion 304 on the first path 408 or the motion of the second support portion 306 on the second path 410.

In accordance with an embodiment, the user input may correspond to a selection of a configuration setting of a set of configuration settings of the display apparatus 102. The selection of the configuration setting may correspond to the configuration of the display screen 102a. In accordance with an embodiment, the set of configuration settings may include at least one of a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, or a default mode. In accordance with an embodiment, the circuitry 202 may be further configured to control the motion of the set of support portions 102b further based on the configuration setting corresponding to the received user input.

In accordance with an embodiment, an amount of the change in the surface curvature may be different for each configuration setting of the set of configuration settings corresponding to the received user input. In accordance with an embodiment, the user input may include one of a voice input, a gesture input, a touch input, or an input via an external device (e.g. external device 308).

In accordance with an embodiment, the circuitry 202 may be further configured to control the motion of the set of support portions 102b based on a playback of media content on the display screen 102a. In accordance with an embodiment, the circuitry 202 may be further configured to detect a number of viewers associated with the display screen 102a. The circuitry 202 may be further configured to control the motion of the set of support portions 102b to change the surface curvature of the display screen 102a based on the detected number of viewers.

In accordance with an embodiment, the circuitry 202 may be further configured to determine at least one of a posture of a viewer or a distance of the viewer from the display screen 102a. The circuitry 202 may be further configured to control the motion of the set of support portions 102b based on at least the determined posture of the viewer or the determined distance of the viewer from the display screen 102a.

In accordance with an embodiment, the circuitry 202 may be further configured to control the motion of the set of support portions 102b portions based on date-time information of display of media content on the display screen 102a. In accordance with an embodiment, the circuitry 202 may be further configured to adjust the display of the media content on the display screen 102a based on the change in the surface curvature of the display screen 102a. In accordance with an embodiment, the change in the surface curvature of the display screen 102a may correspond to a change in an angle of surface curvature and a radius of surface curvature of the display screen 102a.

In accordance with an embodiment, the display apparatus 102 may further comprise a memory (e.g. memory 208) configured to store user preferences. The circuitry 202 may be further configured to control the motion of the set of support portions 102b based on the stored user preferences. In accordance with an embodiment, the circuitry 202 may be further configured to control the motion of the set of support portions 102b based on user information associated with a viewer of the display screen 102a. The user information may comprise at least one of a mood or an event associated with the viewer.

In accordance with an embodiment, the display apparatus 102 may further include a set of speakers (e.g. first speaker 704a and second speaker 706a) coupled to the set of support portions 102b. In accordance with an embodiment, the circuitry 202 may be further configured to control motion of the first speaker 704a and the second speaker 706a. The control of the motion of the first speaker 704a and the second speaker 706a may correspond to the control of the motion of the set of support portions 102b. In accordance with an embodiment, the set of support portions 102b may comprise at least a hook, an attachment panel, a support stand, a frame, and a cable connection panel.

Various embodiments of the disclosure may provide a non-transitory computer readable medium and/or storage medium, and/or a non-transitory machine readable medium and/or storage medium having stored thereon, a machine code and/or a set of instructions executable by a machine, such as the display apparatus 102, and/or a computer. The set of instructions in the display apparatus 102 may cause the machine and/or computer to perform the operations that include a reception of a user input that corresponds to a configuration of the display screen. The operations may further include a control of the motion of the set of support portions based on the received user input. A change in a surface curvature of a display screen of the display apparatus is based on the motion of the set of support portions.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A display apparatus, comprising:
    a set of support portions;
    a display screen coupled to the set of support portions; and
    circuitry configured to:
        receive a user input that corresponds to selection of a configuration setting of a plurality of configuration settings of the display screen;
        determine a surface curvature of the display screen from a plurality of different surface curvatures based on the selected configuration setting, wherein the plurality of configuration settings includes a plurality of viewing modes, and the plurality of viewing modes corresponds to the plurality of different surface curvatures;
        control motion of the set of support portions based on the determined surface curvature of the display screen; and
        control a change in the surface curvature of the display screen to the determined surface curvature based on the motion of the set of support portions.

2. The display apparatus according to claim 1, wherein
the set of support portions comprises a first support portion and a second support portion, and
the display screen is between the first support portion and the second support portion.

3. The display apparatus according to claim 2, wherein the circuitry is further configured to:
control the motion of the first support portion in a first direction; and
control the motion of the second support portion in a second direction, and the first direction is different from the second direction.

4. The display apparatus according to claim 2, wherein
the first support portion is on a first path and the second support portion is on a second path,
the first path is curved towards the second path, and
the circuitry is further configured to control the change in the surface curvature of the display screen based on at least one of the motion of the first support portion on the first path or the motion of the second support portion on the second path.

5. The display apparatus according to claim 1, wherein the selection of the configuration setting corresponds to a configuration of the display screen.

6. The display apparatus according to claim 5, wherein the plurality of viewing modes comprises a cinema mode, an immersive mode, an immersive-three dimensional (3D) mode, a 3D mode, a wallpaper mode, a multi-user audience mode, a gaming mode, a mood-based mode, an ambience-based mode, an event-based mode, a content-adaptive mode, and a default mode.

7. The display apparatus according to claim 5, wherein the circuitry is further configured to control the motion of the set of support portions based on the configuration setting corresponding to the received user input.

8. The display apparatus according to claim 5, wherein an amount of the change in the surface curvature is different for each configuration setting of the plurality of configuration settings corresponding to the received user input.

9. The display apparatus according to claim 1, wherein the user input comprises one of a voice input, a gesture input, a touch input, or an input via an external device.

10. The display apparatus according to claim 1, wherein the circuitry is further configured to control the motion of the set of support portions based on a playback of media content on the display screen.

11. The display apparatus according to claim 1, wherein the circuitry is further configured to:
detect a number of viewers associated with the display screen; and
control the motion of the set of support portions based on the detected number of viewers.

12. The display apparatus according to claim 1, wherein the circuitry is further configured to:
determine at least one of a posture of a viewer or a distance of the viewer from the display screen; and
control the motion of the set of support portions based on the at least one of the posture of the viewer or the distance of the viewer from the display screen.

13. The display apparatus according to claim 1, wherein the circuitry is further configured to control the motion of the set of support portions based on date-time information of display of media content on the display screen.

14. The display apparatus according to claim 13, wherein the circuitry is further configured to adjust the display of the media content on the display screen based on the change in the surface curvature of the display screen.

15. The display apparatus according to claim 1, wherein the motion of the set of support portions correspond to one of a linear motion, a non-linear motion, or a combination of the linear motion and the non-linear motion of the set of support portions along a defined path.

16. The display apparatus according to claim 1, wherein the change in the surface curvature of the display screen corresponds to a change in an angle of the surface curvature of the display screen and a radius of the surface curvature of the display screen.

17. The display apparatus according to claim 1, further comprising a memory configured to store user preferences,
wherein the circuitry is further configured to control the motion of the set of support portions based on the stored user preferences.

18. The display apparatus according to claim 1, wherein the circuitry is further configured to:
determine a mood of a viewer of the display screen based on an image of a facial expression of the viewer; and
control the motion of the set of support portions based on user information associated with the viewer of the display screen, wherein
the user information comprises the determined mood of the viewer and an event associated with the viewer.

19. The display apparatus according to claim 1, further comprising a set of speakers coupled to the set of support portions.

20. The display apparatus according to claim 19, wherein
the circuitry is further configured to control motion of the set of speakers, and
the control of the motion of the set of speakers corresponds to the control of the motion of the set of support portions.

21. The display apparatus according to claim 1, wherein the set of support portions comprises at least one of a hook, an attachment panel, a support stand, a frame, or a cable connection panel.

22. A method, comprising:
in a display apparatus:
receiving a user input that corresponds to selection of a configuration setting of a plurality of configuration settings of a display screen coupled to a set of support portions;
determining a surface curvature of the display screen from a plurality of different surface curvatures based on the selected configuration setting, wherein the plurality of configuration settings includes a plurality of viewing modes, and the plurality of viewing modes corresponds to the plurality of different surface curvatures;
controlling motion of the set of support portions based on the determined surface curvature of the display screen; and
controlling a change in the surface curvature of the display screen to the determined surface curvature based on the motion of the set of support portions.

\* \* \* \* \*